United States Patent Office 3,097,712
Patented July 16, 1963

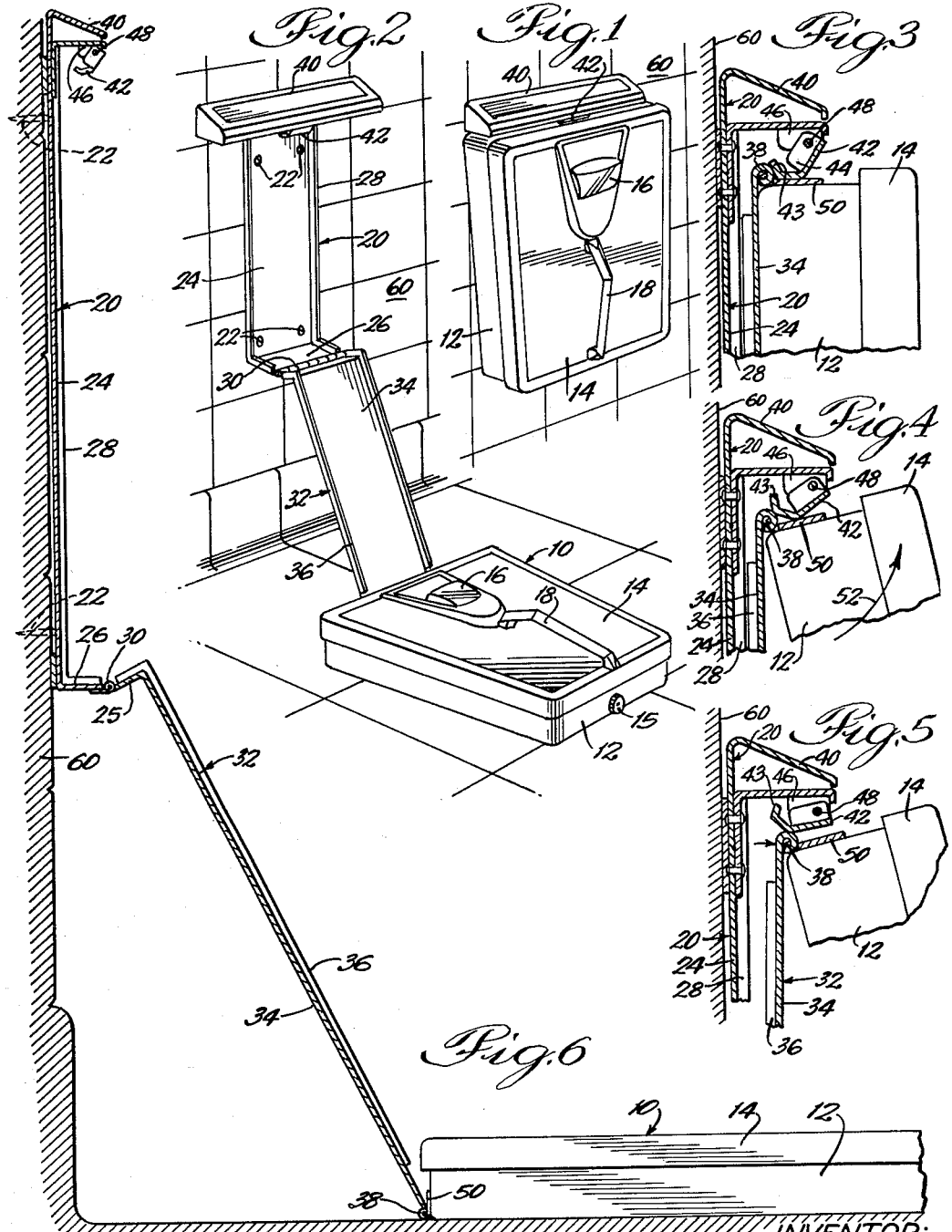

3,097,712
WEIGHING SCALE
Walter R. Johnson, Chicago, Ill., assignor to The Borg-Erickson Corporation, Chicago, Ill.,
Filed Feb. 18, 1960, Ser. No. 9,487
6 Claims. (Cl. 177—126)

This invention relates generally to improvements in weighing scales, and more particularly to new and improved scale supporting means of the type which is selectively actuatable to maintain the weighing scales in operative or non-operative position.

Portable weighing scales, of the type generally employed for office or personal use, normally are adapted to be supported by a table or floor during their periods of use. Such portable scales frequently are left on the table or floor, even during periods of non-use, with the consequent disadvantage of possible injury to either the scale or to persons who accidentally come into contact therewith. A further disadvantage is the continued utilization by the scale of table or floor space that could be used for other purposes when the scale is not in use.

In view of the considerations set forth above, it heretofore has been proposed to provide means for mounting the portable scale upon a wall or some other vertical surface such that the scale may selectively be maintained upon a suitable horizontal supporting surface during its periods of use or, alternatively, positioned against a vertical support during periods of non-use. An illustrative mounting means of this type is shown, for example, in the patent to W. H. Greenleaf, No. 2,181,272, issued November 28, 1939.

It is a general object of this invention to provide new and improved selectively operable means for positioning a portable scale in either a horizontal operative position or a vertical storage position.

More particularly, it is an object of this invention to provide new and improved locking means for supporting and maintaining a portable weighing scale against a vertical support member during periods of non-use which means may readily be released to enable the scale to be positioned upon a horizontal support when the scale is to be utilized.

In accordance with a feature of this invention, the scale is pivotally connected to one end of a support link, the other end of which is pivotally connected to a support bracket adapted to be fixedly secured to a vertical support, such as a wall of a bedroom or bathroom. Due to the pivotal action of each end of the support link, the scale may be vertically positioned during periods of non-use against the support bracket or, if desired, the scale may be pulled down into horizontal position where it is supported by the floor and is ready for use.

It is a further feature of this invention that the scale is automatically locked into its storage position when it is positioned against the support bracket by the operation of a unique releasable lock member adapted to securely engage the support link to hold the scale firmly in place against the support bracket.

In accordance with a still further feature of this invention, the rotational movement of the scale which takes place when it is being urged out of the storage position serves to automatically release the releasable lock member to facilitate the lowering of the scale from its vertical storage position to its horizontal operating position.

It is another object of this invention to provide improved releasable lock means for enabling a portable type weighing scale to be supported in either one of two selectable positions.

It is still another object of this invention to provide novel support means for a portable weighing scale, as set forth above, which is characterized by its relative simplicity and economy of construction, its reliability, and its ease of operation.

With these and other objects in view, the invention consists in the construction, arrangement, and combination of the various parts of the scale supporting means, whereby the objects contemplated are attained, as hereinafter set forth. The various features of novelty which characterize the invention are pointed out with particularity in the claims annexed to and forming a part of this specification. For a better understanding of the invention and its advantages, reference is had to the accompanying drawing and descriptive matter in which are illustrated and described an illustrative embodiment of the invention.

In the drawing:

FIGURE 1 is a perspective view of the invention showing the weighing scale in its storage or non-use position upon a vertical supporting surface;

FIGURE 2 is a perspective view of the invention showing the weighing scale in its use position upon a horizontal supporting surface;

FIGURES 3, 4, and 5 are partial end views of the invention, partly in cross-section, illustrating the operation of the releasable lock member; and FIGURE 6 is an end view, partly in cross-section, illustrating the construction of the support link, support bracket, and releasable lock member apparatus in accordance with the invention.

Referring now to the drawing, and more particularly to FIGURES 1, 2, and 6 thereof, there is shown an illustrative embodiment of the invention which comprises a novel support and mounting means for a portable type weighing scale which is adapted to be selectively actuated to permit the scale to be placed upon a horizontal supporting surface during its periods of use, or alternatively, upon a vertical supporting surface during its periods of non-use. The portable weighing scale is identified generally at 10 and advantageously comprises a rigid casing 12 having a movable platform 14 positioned thereupon. The weighing scale 10 may be of any type known in the art, and advantageously includes a transparent window 16 for enabling the viewing of the movable scale dial therethrough, a zero adjust knob 15, and a handle 18 spanning the longitudinal center portion of the platform 14.

An elongated support link 32 is pivotally connected at one end thereof to the rigid casing 12 of scale 10, as by means of the hinge plate 50 and the hinge pin 38. This connection permits the scale 10 to be rotated freely about the elongated support link 32 during the selective operation of the support means comprising the invention. As shown particularly in FIGURES 2 and 6, the elongated support link 32 advantageously comprises a base 34 and a pair of upwardly extending side flanges 36. Preferably, the width of the support link 32 between the side flanges 36 is made smaller than the over-all width of the weighing scale 10, as shown in this particular illustrative embodiment.

The upper end of the support link 32 is provided with a flange portion 25 which is adapted to be pivotally connected, by means of the hinge member 30, to the lower flange portion 26 of the vertically positioned support bracket 20. As shown in FIGURES 2 and 6 of the drawing, the vertically positioned elongated support bracket 20 is adapted to be fixedly secured to a vertical supporting surface, such as the wall 60, which advantageously may be a wall or door of a bathroom or bedroom. The support bracket 20 may be secured to the wall or door 60 by any suitable fastening means, as for example, the screws 22 shown in FIGURE 6 as extending through the support bracket to the wall or door, or, alternatively, by any suitable adhesive.

Advantageously, in the illustrative embodiment of this invention, the support bracket 20 is formed with a base portion 24 and a pair of upwardly extending side flanges 28. Preferably, the width of the support bracket 20 between the side flanges 28 is slightly greater than the width of the support link 32 so that the support link may be nested within the support bracket when the scale 10 is raised to its vertically supported position of non-use. Manifestly, this mating arrangement of the support bracket and support link serves to reduce the depth of the over-all structure to the end that the scale 10 may be positioned in its vertical support position with a minimal extension outwardly from the support wall 60.

The upper end of the support bracket 20 is connected to an outwardly extending cover or hood 40. Advantageously, as shown in FIGURE 1 of the drawing, hood 40 may be formed with a width substantially equal to the width of the portable weighing scale 10 to provide a pleasing and attractive appearance when the scale is positioned in its vertical, non-use position.

In accordance with an important feature of this invention, a releasable lock member 42 is pivotally attached to the hood 40, as by means of the lock member bracket 46, which lock member is adapted to automatically maintain the weighing scale 10 in its vertical non-use position when the weighing scale is raised and the support link 32 is nested within the support bracket 20. Further, in accordance with a feature of this invention, the lock member 42 is adapted to be automatically released when the portable weighing scale 10 is moved out of its vertical storage position to enable the scale to be placed upon the horizontal supporting surface in readiness for use.

This highly unique and advantageous operation is effected by the construction of the lock member 42 and its associated operative parts as illustrated in FIGURES 3, 4, and 5 of the drawing. As there shown, the lock member 42 comprises an angularly formed flange portion 43 and a pair of end flanges 44. The lock member 42 advantageously is pivotally connected to the hood 40, as by means of the bearing member 48, which extends from one end flange to the other of the lock member. In accordance with a feature of this invention, a suitable torsion spring or the like is provided about the bearing member 48 to bias or urge the lock member 42 in a direction away from the support bracket 20.

In the operation of the invention, when the portable weighing scale 10 is rotated upwardly into its vertical non-use position, the hinge plate 50 is engaged by the lock member 42 to securely maintain the weighing scale 10 in its vertical storage position. As particularly shown in FIGURE 3 of the drawing, the flanged portion 43 of lock member 42 engages the hinge member 38 and the hinge plate 50 in a firm manner, due to the operation of the torsion spring (not shown), to hold the weighing scale 10 firmly in place.

When it is desired to remove the weighing scale 10 from its vertical storage position into its position of use, the scale is rotated upwardly and outwardly from the support bracket 20, at the hinge 38, in response to the pulling forces present at the handle 18. This upwardly and outwardly rotating movement is illustrated in FIGURE 4 of the drawing, by the arrow 52. It can be seen from FIGURE 4 of the drawing, that as the scale 10 is rotated upwardly, the hinge plate 50 bears against the lock member 42 to depress the lock member inwardly against the bias of the torsion spring. The inward rotation of the lock member 42 serves to release the scale 10 by disengaging the flanged portion 43 of the lock member 42 from the hinge 38 and hinge plate 50. Accordingly, the flange portion 43 of lock member 42 is caused to slide over the hinge 38 to automatically release the support link 34 and the scale 10 from its formerly locked condition. Thus, it can be seen that the scale 10 then may be lowered to its horizontal support surface in readiness for use.

It now will be appreciated by those skilled in the art that there has been shown and described above a specific illustrative embodiment of the invention which comprises novel mounting and supporting means for selectively locking or releasing a portable weighing scale in either one of two positions, namely, a storage position against a vertical support and a use position against a horizontal support. It will be understood by those skilled in the art that various modifications and alternative constructions may be made without departing from the true spirit and scope of the invention. Therefore, it is intended to cover by the appended claims all such modifications and alternative constructions as fall within their true spirit and scope.

What is claimed in the invention is:

1. The improvement of a weighing scale and mounting therefor comprising, in combination, a weighing mechanism adapted to be flat upon a horizontal supporting surface during use thereof and upon a vertical supporting surface during non-use thereof, said weighing mechanism having its operating parts enclosed within a rigid casing, a bracket member fixedly secured to said vertical supporting surface at a point spaced above said horizontal supporting surface, an elongated link member pivotally connected at one end thereof to the lower portion of said bracket member and pivotally connected by hinge means at the other end thereof to said casing for enabling said casing to be moved upwardly from said horizontal supporting surface into engagement with said bracket member, and releasable lock means connected to the upper portion of said bracket member, said releasable lock means comprising a biased lock member pivotally connected to said bracket member for pivoting operation when said casing is moved upwardly into its non-use position and for locking engagement with said hinge means at the completion of the upward movement to automatically lock said casing in non-use position, said biased lock member being pivotally operated to automatically release said hinge means when the casing is rotated outwardly from said bracket member against the lock member to be returned to its position of use upon said horizontal supporting surface.

2. The improvement of a weighing scale and mounting therefor comprising, in combination, a weighing mechanism adapted to be flat upon a horizontal supporting surface during use thereof and upon a vertical supporting surface during non-use thereof, said weighing mechanism having its operating parts enclosed within a rigid casing, a bracket member fixedly secured to said vertical supporting surface at a point spaced above said horizontal supporting surface, an elongated link member pivotally connected at one end thereof to the lower portion of said bracket member and pivotally connected by hinge means at the other end thereof to said casing for enabling said casing to be moved upwardly from said horizontal supporting surface into engagement with said bracket member, and releasable lock means connected to the upper portion of said bracket member operative to automatically lock said casing in non-use position when the latter is moved upwardly into engagement with the bracket member and further operative to automatically release said casing when the latter is rotated outwardly from said bracket member to be returned to its position of use upon said horizontal supporting surface, said releasable lock means comprising a first member fixedly secured to said bracket member, and a second member pivotally connected to said first member, said second member being formed with a flanged portion and having spring means associated therewith for normally urging said second member to a locking position in engagement with said hinge means, wherein said flanged portion serves to maintain said casing against said bracket member in its non-use position, said casing when rotated outwardly from its non-use position serving to pivot said second member in opposition to said spring means to release said second member from its locking position, thereby releasing said casing to permit it to be lowered into its position for use.

3. The improvement of a weighing scale and mounting therefor comprising, in combination, a weighing mechanism adapted to be flat upon a horizontal supporting surface during use thereof and upon a vertical supporting surface during non-use thereof, a bracket member fixedly secured to said vertical supporting surface at a point spaced above said horizontal supporting surface, an elongated link member of lesser width than said weighing mechanism pivotally connected at one end thereof to the lower portion of said bracket member and pivotally connected by hinge means at the other end thereof to an end wall of said weighing mechanism, and releasable lock means including a resiliently biased locking member pivotally connected to the upper portion of said bracket member pivotally operative to automatically engage said hinge means and lock said casing in non-use position when the latter is moved upwardly into engagement with the bracket member and further pivotally operative to automatically release said hinge means and said casing when the latter is rotated outwardly from said bracket member to be returned to its position of use upon said horizontal supporting surface.

4. In combination, a weighing scale adapted to be flat upon a horizontal supporting surface during use thereof and upon a vertical supporting surface during non-use thereof, a bracket member fixedly secured to said vertical supporting surface at a point spaced above said horizontal supporting surface, an elongated link member of lesser width than said weighing scale pivotally connected at one end thereof to the lower portion of said bracket member and pivotally connected by hinge means at the other end thereof to one end of said scale, and releasable lock means including a resiliently biased lock member pivotally connected to said bracket member for automatically engaging said hinge means and locking said scale in non-use position when the latter is moved upwardly to pivotally operate said lock member and further operative for automatically releasing said scale when the latter is rotated outwardly to again pivotally operate said lock member to be returned to its position of use upon said horizontal supporting surface.

5. The combination in accordance with claim 4 further comprising handle means positioned on the top surface of said weighing scale for enabling said scale to be moved upwardly into locking engagement with said releasable lock means and further for enabling said scale to be rotated outwardly from said bracket member to pivotally operate said lock member and release said releasable lock means from said hinge means for enabling the scale to be returned to its position of use.

6. The combination in accordance with claim 5 wherein said releasable lock means comprises a first member fixedly secured to said bracket member and a second member pivotally connected to said first member, said second member being formed with an outwardly biased flanged portion operative to lock said link member and scale in non-use position against said bracket, the outward rotation of said scale by said handle means serving to force said flanged portion inwardly to release said link member and scale to enable the scale to be lowered into its position of use upon the horizontal supporting surface.

References Cited in the file of this patent
UNITED STATES PATENTS

| | | |
|---|---|---|
| 2,181,272 | Greenleaf | Nov. 28, 1939 |
| 2,872,178 | Holland | Feb. 3, 1959 |
| 2,924,443 | Townsend et al. | Feb. 9, 1960 |

FOREIGN PATENTS

| | | |
|---|---|---|
| 675,113 | France | Oct. 29, 1929 |